United States Patent [19]

Freitag et al.

[11] Patent Number: 4,617,368
[45] Date of Patent: Oct. 14, 1986

[54] PROCESS FOR THE PRODUCTION OF COLORLESS AROMATIC POLYESTER AND POLYESTER CARBONATES

[75] Inventors: Dieter Freitag; Ludwig Bottenbruch, both of Krefeld; Uwe Hucks, Alpen, all of Fed. Rep. of Germany

[73] Assignee: Bayer Aktiengesellschaft, Leverkusen, Fed. Rep. of Germany

[21] Appl. No.: 680,158

[22] Filed: Dec. 10, 1984

[30] Foreign Application Priority Data

Dec. 24, 1983 [DE] Fed. Rep. of Germany ....... 3346946

[51] Int. Cl.$^4$ ................................................ C08G 8/02
[52] U.S. Cl. ...................................... 528/126; 528/125; 528/128; 528/173; 528/176; 528/179; 528/180; 528/181; 528/182; 528/190; 528/191; 528/193; 528/194
[58] Field of Search ............... 528/125, 126, 128, 173, 528/176, 179–182, 190, 191, 193, 194

[56] References Cited

U.S. PATENT DOCUMENTS

| | | | |
|---|---|---|---|
| 4,349,659 | 9/1982 | Kato et al. | 528/193 |
| 4,381,391 | 4/1983 | Chen et al. | 528/173 |
| 4,482,694 | 11/1984 | Freitag et al. | 528/173 |
| 4,528,146 | 7/1985 | Bockmann et al. | 528/128 |

FOREIGN PATENT DOCUMENTS

| | | |
|---|---|---|
| 0088322 | 9/1983 | European Pat. Off. . |
| 0095698 | 12/1983 | European Pat. Off. . |
| 1495626 | 6/1971 | Fed. Rep. of Germany . |
| 2232877 | 1/1974 | Fed. Rep. of Germany . |
| 2703376 | 8/1977 | Fed. Rep. of Germany . |
| 2714544 | 10/1977 | Fed. Rep. of Germany . |
| 3000610 | 7/1980 | Fed. Rep. of Germany . |
| 2940024 | 4/1981 | Fed. Rep. of Germany . |
| 3007934 | 9/1981 | Fed. Rep. of Germany . |

*Primary Examiner*—Lucille M. Phynes
*Attorney, Agent, or Firm*—Connolly and Hutz

[57] ABSTRACT

The invention relates to a process for the production of colorless, heat-stable and hydrolysis-stable aromatic polyesters and polyester carbonates by conventional interfacial polycondensation of aromatic dicarboxylic acid dichlorides and diphenolates in which dicarboxylic acid dichlorides are used which have been obtained by chlorination from the dimethyl esters of the corresponding acids, and tertiary cycloaliphatic amines are used as catalysts.

7 Claims, No Drawings

PROCESS FOR THE PRODUCTION OF COLORLESS AROMATIC POLYESTER AND POLYESTER CARBONATES

Pure aromatic polyesters and polyester carbonates are known plastics with excellent technological properties.

They can be produced by ester interchange in melts, for example according to "Polyesters", Pergamon Press 1965, page 448 et seq, DE-OS Nos. 14 95 626, 22 32 877, 27 03 376 and 30 00 610. Colourless polyesters, however, are not obtained by ester interchange in the melt as the materials are subjected to excessive thermal stresses.

Another method involves ester interchange reaction of acid dichlorides and diphenols in tertiary amines as solvents and acid acceptors. This process is also described in "Polyesters" and in DE-OS No. 27 14 544. The quantitative separation of the tertiary base is difficult in this process. The products also tend to discolour during thermoplastic processing.

The best-coloured aromatic polyesters and polyester carbonates are obtained by the phase interface process from acid dichlorides and diphenolates. This process has also been described, for example, in "Polyesters" and in DE-OS No. 30 07 934, EP No. 10 840 and DE-OS No. 20 40 024.

In addition to the production process, the quality of the starting materials in the phase interface process, in particular that of the aromatic dicarboxylic acid chlorides has a great influence on the colour, stability to hydrolysis and stability to heat of the aromatic polyesters and polyester carbonates.

The invention is based on the fact that aromatic polyesters and polyester carbonates having a particularly desirable colour value and, in particular, good stability to hydrolysis and to heat are obtained by the phase interface process if the dicarboxylic acid dichlorides which are used as starting materials have been produced by chlorination of the dimethyl esters of aromatic dicarboxylic acids (for example, according to DBP No. 10 64 496 or DE-AS No. 11 52 400), and tertiary cycloaliphatic amines are at the same time used as catalysts. Both conditions must be met simultaneously.

If, for example, dicarboxylic acid dichlorides produced by chlorination of the corresponding carboxylic acid with $SOCl_2$, $COCl_2$ or phosphorus chlorides are used, the physical properties of the polyesters are substantially poorer even if polycondensation has been carried out in the presence of tertiary cycloaliphatic amines. The properties obtainable are even poorer with other amines, for example open-chain tertiary amines. Surprisingly, this applies even if the dicarboxylic acid dichlorides are purified by distillation and no difference between the aromatic dicarboxylic acid dichloride obtained by various production processes can be determined by chromatographic analysis.

The invention therefore relates to a process for the production of colourless aromatic polyesters and polyester carbonates which are stable to heat and to hydrolysis by conventional phase interface polycondensation of aromatic dicarboxylic acid dichlorides and diphenolates, which is characterised in that dicarboxylic acid dichlorides are used which have been obtained from the dimethyl esters of the corresponding acids by chlorination, and tertiary cycloaliphatic amines are used as catalysts.

Preferred diphenols include compounds corresponding to the formula

HO—Z—OH wherein Z represents a divalent mononuclear or polynuclear aromatic radical with 6 to 30 carbon atoms and both OH groups are each bound directly to an aromatic carbon atom.

Particularly preferred diphenols are compounds corresponding to the formula

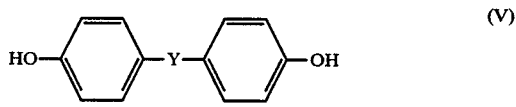

(V)

in which
Y represents a single bond, an alkylene or alkylidene radical with 1 to 7 carbon atoms, a cycloalkylene or cycloalkylidene radical with 5 to 12 carbon atoms,

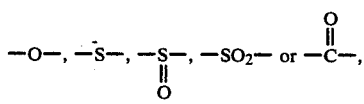

as well as derivatives which are alkylated and halogenated in the nucleus, for example, Hydroquinone, Resorcinol, Dihydroxydiphenyls, Bis-(hydroxyphenyl)-alkanes, Bis-(hydroxyphenyl)-cycloalkanes, Bis-(hydroxyphenyl)-sulphides, Bis-(hydroxyphenyl)-ethers, Bis-(hydroxyphenyl)-ketones, Bis-(hydroxyphenyl)sulphoxides, Bis-(hydroxyphenyl)-sulphones, and $\alpha,\alpha'$-Bis-(hydroxyphenyl)-diisopropylbenzenes, as well as derivatives thereof which are alkylated and halogenated in the nucleus, in particular, for example, bisphenol A=2,2-bis-(4-hydroxyphenyl)-propane, tetramethylbisphenol A, 1,1-bis-(4-hydroxyphenyl)-isobutane, 1,1-bis-(4-hydroxyphenyl)-cyclohexane, 4,4'-dihydroxydiphenylsulphide, 4,4'-dihydroxydiphenyl, 4,4'-dihydroxydiphenylsulphone as well as dihalogenated and tetrahalogenated derivatives thereof. Bisphenol A is particularly preferred. Any mixtures of the abovementioned diphenols can also be used.

Suitable dicarboxylic acid dichlorides for the aromatic polyesters and polyester carbonates according to the invention include: Terephthalic acid dichloride, isophthalic acid dichloride, o-phthalic acid dichloride, diphenyl dicarboxylic acid dichloride, diphenyl ether dicarboxylic acid dichloride, naphthalene dicarboxylic acid dichloride and mixtures thereof.

Trifunctional or higher functional carboxylic acid chlorides and/or phenols can preferably be used in quantities of 0.01 to 1 mol %, based on dicarboxylic acid chlorides or diphenols used, as branching agents for the aromatic polyesters and polyester carbonates.

Preferred chain terminators for the aromatic polyesters and polyester carbonates include phenols, alkyl phenols with $C_1$-$C_{12}$ alkyl groups, halogenated phenols, hydroxydiphenyl, naphthenes, chlorocarbonic acid esters of phenolic compounds and chlorides of aromatic monocarboxylic acids which can optionally be substituted by $C_1$-$C_{12}$ alkyl groups and halogen atoms, in quantities of 0.1 to 10 mol % (based on diphenols in the case of phenols and on acid dichlorides in the case of acid chlorides). The chlorides of aliphatic monocarboxylic acids with up to 22 carbon atoms are also suitable. If phenolic compounds are used, the chain terminators can be added to the reaction mixture before the beginning of or during the reaction. However, there must be sufficient acid chloride and/or phosgene available for them to react and to be able to limit the chain. For example, the chain terminator can be used together with the diphenol, can be contained in the solution of chlorides of aromatic dicarboxylic acids or be added to the reaction mixture after production of a precondensate.

If acid chlorides and chlorocarbonic acid esters are used as chain terminators, they are preferably introduced together with aromatic dicarboxylic acid dichlorides and/or phosgene. These chain terminators can also be added to the reaction mixture at a moment when the chlorides of dicarboxylic acid and the phosgene have already reacted substantially or to completion.

Aliphatic structural groups, for example adipic acid or butane diol-1,4 can also participate up to 30 mol % respectively of the dicarboxylic acids and dihydroxy-compounds in the structure of the aromatic polyesters and polyester carbonates.

The aromatic polyesters and polyester carbonates can also be synthesized in part of aromatic hydroxycarboxylic acids, for example p-hydroxybenzoic acid. The proportion of these hydroxycarboxylic acids can be up to 100 mol % (based on bisphenol).

If isophthalic and terephthalic acid both participate in the synthesis of the aromatic polyesters and polyester carbonates, they can be used in a ratio of 1:20 to 20:1.

The aromatic polyester carbonates produced according to the invention can contain up to 80 mol %, preferably up to 50 mol % of carbonate groups, based on the sum of ester and carbonate groups.

Both the ester and the carbonate content of the aromatic polyester carbonates according to the invention can be present in the form of blocks or statistiscally distributed in the polycondensate.

The production of the aromatic polyesters and polyester carbonates is known and described, for example, in DOS Nos. 1495626, 2232877, 2703376, 3000610, 2714544, 2940024, 3007934.

The relative solution viscosity ($\mu$rel) of the aromatic polysters and polyester carbonates generally lies in the range of from 1.18 to 1.4, preferably from 1.22 to 1.3 (measured in solutions of 0.5 g of polycondensate in 100 ml of $CH_2Cl_2$ solution at 25° C.).

The cycloaliphatic tertiary amines used as catalysts according to the invention generally contain 1 to 4, preferably 1 or 2 heteroatoms, incorporated in a 4 to 7-membered cycloaliphatic ring, of which at least one member is a tertiary nitrogen atom.

Apart from nitrogen atoms, oxygen and/or sulphur atoms, for example, can be used as heteroatoms. The cycloaliphatic tertiary amines can be condensed with one to two $C_5$–$C_8$ cycloaliphatic or aromatic rings. In these cases, tertiary nitrogen atoms can also act as bridge-head atoms.

Preferred tertiary amines in the context of the invention include, for example, N-$C_1$–$C_6$-alkyl-pyrrolidines, -piperidines, -morpholines, -dihydroindoles, -dihydroisoindoles, -tetrahydroquinolines, -tetrahydroisoquinolines, -benzomorpholines, 1-azabicyclo-[3.3.0]-octane, quinuclidine, N-$C_1$–$C_6$-alkyl-2-azabicyclo-[2.2.1]-octane, N-$C_1$–$C_6$-alkyl-2-azabicyclo-[3.3.1]-nonane, N-$C_1$–$C_6$ alkyl-3-azabicyclo-[3.3.1]-nonane.

N-ethylpyrrolidine, N-ethylpiperidine, N-ethylmorpholine, N-isopropylpiperidine and N-isopropylmorpholine, are particularly preferred.

The aromatic polyesters and polyester carbonates produced according to the invention can contain stabilizers, flow agents, plasticisers, mould-release agents, reinforcing materials and fillers such as, for example, glass fibres, glass beads, asbestos, and carbon fibres, diatomaceous earth, kaolin, chalk, rock dust and pigments.

The aromatic polyesters and polyester carbonates produced according to the invention can be processed by conventional processes in injection moulding machines to form shaped articles or in extruders to form semi-finished products.

The moulding compositions can also be used wherever particularly high requirements are imposed on the quality of the shaped article with respect to colour, transparency, resistance to hydrolysis, stability to thermal shaping and stability to oxidation.

EXAMPLES

Description of the Method for Measuring the Yellowness Indexes

Determination of the Yellowness Indexes by Spectroscopy

To determine the colour change, 4 g of the polymer in each case were dissolved in 100 ml $CH_2Cl_2$, the transmission was measured in the solution in a layer thickness of 10 cm (corresponding to an injected test-piece having a layer thickness of 4 mm) with light having wave-lengths of 400 to 700 mm (visual range of the spectrum) and the yellowness indexes G were calculated in accordance with DIN 6167 (draft of December 1978).

Normal light type C (daylight) and the 2°-normal observer were used as a basis. The yellowness indexes thus calculated coincide with the values of the yellowness indexes according to ASTM D 19-2570.

The yellowness indexes are compiled in Table 1.

Determination of Heat Stability

About 3 g of the granulated aromatic polyester of polyester carbonate are in a 100 ml glass flask under a vacuum of 20 mbar immersed in a salt bath at 330° C. (up to the beginning of the neck), left like this for 15 minutes after melting, then the flask is removed from the bath and the substance allowed to cool under a vacuum.

The change in the relative solution viscosity during this tempering of the melt is a gauge of the heat stability of the sample. Moreover, the thermal oxidation was determined by measuring the notched impact strength of injection moulded standard small rods after 500 hours' storage in air at 150° C.

Determination of Stability to Hydrolysis

Some injection-moulded standard small rods were stored for 500 hours in boiling water and the stability to hydrolysis assessed by the change in the notched impact strength.

The test results are compiled in Table 1.

Starting Materials for the Aromatic Polyester and Polyester Carbonates

Commercial isophthalic and terephthalic acid made by the company Amoco, types I PA 99 and TA 33, were used for the investigations. A commercial product of Bayer A.G. was used as bisphenol A. The relevant acid dichlorides were produced from the dicarboxylic acids by heating with excess SOCl₂ in accordance with DOS No. 30 40294 on the one hand. The dicarboxylic acid dichlorides were purified by distillation.

Moreover, the commercial dimethyl esters of aromatic dicarboxylic acids according to DE-OS No. 32 20729 were converted into dicarboxylic acid dichlorides and also subjected to fractional distillation.

No difference could be determined in the two qualities of dicarboxylic acid dichloride by gas chromatography.

COMPARISON EXAMPLE 1

Aromatic polyesters from bisphenol A and a mixture of isophthalic and terephthalic acid dichloride (1:1). The dicarboxylic acid dichlorides had been produced from the commercial dicarboxylic acids according to DOS No. 3040294 by reaction with SOCl₂ and purified by distillation. Triphenyl phosphine was used as catalyst during chlorination.

2.736 kg (12 mol) BPA,
980 g (24.5 mol) NaOH,
8 g NaBH₄ were dissolved in 30 l of water under N₂, then 6 g of triethyl amine (0.5 mol % of BPA) and 9 l each of dichloromethane and chlorobenzene were added. A solution of 1218.2 g each of isiophthalic and terephthalic acid dichloride and 54.1 g (3 mol % of BPA) of p-tert butylphenol in 4 l of dichloromethane was added within 30 minutes with vigorous stirring and stirred for a further hour.

To process the mixture, the phases were separated, the organic phase acidified with dilute H₃PO₄ and washed free of electrolytes with water. After distilling the dichloromethane from the solution, the chlorobenzene was evaporated in a double shaft extruder under a vacuum at 290° C., and the polyester was removed as a strand and granulated. The material had a relative solution viscosity of 1.289 and a yellowness index of 58.7.

COMPARISON EXAMPLE 2

The process described in Comparison Example 1 was repeated, but 6.8 g of N-ethyl piperidine were used instead of the triethyl amine. The relative solution viscosity μrel of the product was 1.283 and the yellowness index 13.1.

COMPARISON EXAMPLE 3

The process described in Comparison Example 1 was repeated, but the dicarboxylic acid dichloride produced according to DE-OS No. 32 20 729 was used. μrel was 1.291 and the yellowness index was 45.8.

EXAMPLE 1 (according to invention)

Combination of the dicarboxylic acid dichlorides obtained from the dimethyl esters with N-ethylpiperidine as catalyst: μrel 1.289, yellowness index 6.2.

EXAMPLE 2 (according to invention)

The process as described in Example 1 was repeated but 9.8 g of N-ethylbenzomorpholine was used instead of ethylpiperidine: μrel=1.282, yellowness index 5.8.

COMPARISON EXAMPLE 4

Aromatic polyester carbonate from bisphenol A and isophthalic and terephthalic acid dichloride mixture (1:1) with 50 mol % of carbonic ester content. With dichlorides from the SOCl₂ process and triethyl amine as catalyst.

2.736 kg (12 mol) BPA
980 g (24.5 mol) NaOH
8 g NaBH₄ were dissolved in 30 l of water under N₂, then 9 l each of dichloromethane and chlorobenzene were added. A solution of 609.1 g each of isophthalic acid terephthalic acid dichloride in 4 l of dichloromethane was added drop-wise with vigorous stirring then stirred for a further 30 minutes.

After addition of 54.1 g of p-tert.butylphenol, 705 g (20% excess) of phosgene were introduced within 1 hour. On completion of phosgene introduction, 6 g of triethyl amine were added and stirred for a further hour, the pH value of the aqueous phase being maintained at 10 to 12 if necessary by the addition of NaOH.

The mixture was worked up as described in Comparison Example 1.

The product had a μrel value of 1.278, and yellowness index of 48.2.

COMPARISON EXAMPLE 5

As Comparison Example 4, but with 6.8 g of N-ethyl piperidine instead of triethylamine: μrel of the polyester carbonate was 1.280, the yellowness index 11.9.

COMPARISON EXAMPLE 6

Mode of operation as in Comparison Example 4, but with dicarboxylic acid dichloride from dimethyl ester: μrel=1.285, yellowness index 34.7.

EXAMPLE 3 (according to invention)

Combination of dicarboxylic acid dichlorides obtained via dimethyl esters with N-ethylpiperidine as catalyst: μrel=1.286, yellowness index 4.5.

TABLE 1

| Properties of the aromatic polyesters and polyester carbonates produced | | | | | | |
|---|---|---|---|---|---|---|
| Product of | ηrel[1] | Notched impact strength kJ/m²[2] | Yellowness index G | Heat Stability ηrel after heating melt 15 min at 330° C. | Heat Stability after 500 h storage in air at 150° C. kJ/m² | Hydrolysis stability after 500 h storage in water at 100° C. kJ/m² |
| Comp. Example 1 | 1.289 | 28.5 | 58.7 | 1.241 | 9.7 | 8.2 |
| 2 | 1.283 | 27.3 | 13.1 | 1.235 | 8.0 | 6.9 |
| 3 | 1.291 | 29.0 | 45.8 | 1.243 | 7.3 | 6.7 |
| 4 | 2.278 | 36.7 | 48.2 | 1.230 | 9.6 | 8.3 |
| 5 | 1.280 | 37.5 | 11.9 | 1.236 | 10.9 | 7.1 |
| 6 | 1.285 | 38.6 | 34.7 | 1.232 | 8.4 | 7.0 |
| Example 1 | 1.289 | 27.6 | 6.2 | 1.269 | 21.6 | 18.3 |
| 2 | 1.282 | 29.2 | 5.8 | 1.258 | 19.1 | 18.6 |

TABLE 1-continued

| | | | Heat Stability | | Hydrolysis |
| | | Notched | $\eta$rel after | Heat Stability | stability |
| | | impact | heating melt | after 500 h | after 500 h |
| | | strength | Yellowness | 15 min at | storage in air | storage in water at |
| Product of | $\eta$rel[1] | kJ/m²[2] | index G | 330° C. | at 150° C. kJ/m² | 100° C. kJ/m² |
|---|---|---|---|---|---|---|
| 3 | 1.286 | 38.1 | 4.5 | 1.264 | 27.5 | 25.3 |

[1]$\eta_{rel}$ = relative solution viscosity measured in a solution of 0.5 g of polycondensate in 100 ml of $CH_2Cl_2$ solution at 25° C.
[2]Notched impact strength $a_k$ determined according to DIN 53453.

We claim:

1. A process for the production of colourless, heatstable and hydrolysis-stable, pure aromatic polyesters and polyester carbonates which comprises interfacial polycondensation of an aromatic dicarboxylic acid dichloride and a diphenolate, and additionally phosgene to produce polyester carbonates, wherein the dicarboxylic acid dichloride is obtained by chlorination from the dimethyl ester of the corresponding acid, and a tertiary cycloaliphatic amine is used as a catalyst.

2. A process according to claim 1, wherein the diphenolate is derived from a diphenol corresponding to the formula

HO—Z—OH wherein Z represents a divalent mononuclear or polynuclear aromatic radical with 6 to 30 carbon atoms and the OH groups are each bound directly to an aromatic carbon atom.

3. A process according to claim 2, wherein the diphenol corresponds to the formula

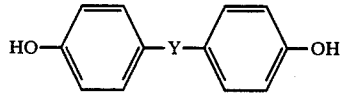

in which
Y represents a single bond, an alkylene or alkylidene radical with 1 to 7 carbon atoms, a cycloalkylene, or cycloalkylidene radical with 5 to 12 carbon atoms,

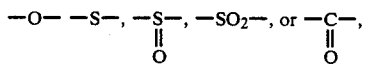

or a derivative thereof which is alkylated or halogenated in the nucleus.

4. A process according to claims 1 or 2 or 3, wherein the dicarboxylic acid dichloride is terephthalic acid dichloride, isophthalic acid dichloride, o-phthalic acid dichloride, diphenyl dicarboxylic acid dichloride, diphenyl ether dicarboxylic acid dichloride, naphthalene dicarboxylic acid dichloride, or any mixture thereof.

5. A process according to claims 1 or 2 or 3, wherein the cycloaliphatic tertiary amine used as catalyst contains 1 to 4 heteroatoms incorporated in a 4- to 7-membered cycloaliphatic ring, of which at least one member is a tertiary nitrogen atom.

6. An aromatic polyester or polycarbonates made by a process according to claims 1 or 2 or 3.

7. A moulded or extruded article produced from aromatic polyester or polycarbonates according to claim 6.

* * * * *